April 9, 1968  E. K. KAPRELIAN ET AL  3,376,945
DUAL-MODE VEHICLE

Filed Oct. 5, 1965  3 Sheets-Sheet 1

INVENTORS
Edward K. Kaprelian
Joseph T. Gurganious
BY: Harry M. Saragovitz,
Edward J. Kelly &
A. J. Dupont
Attorneys.

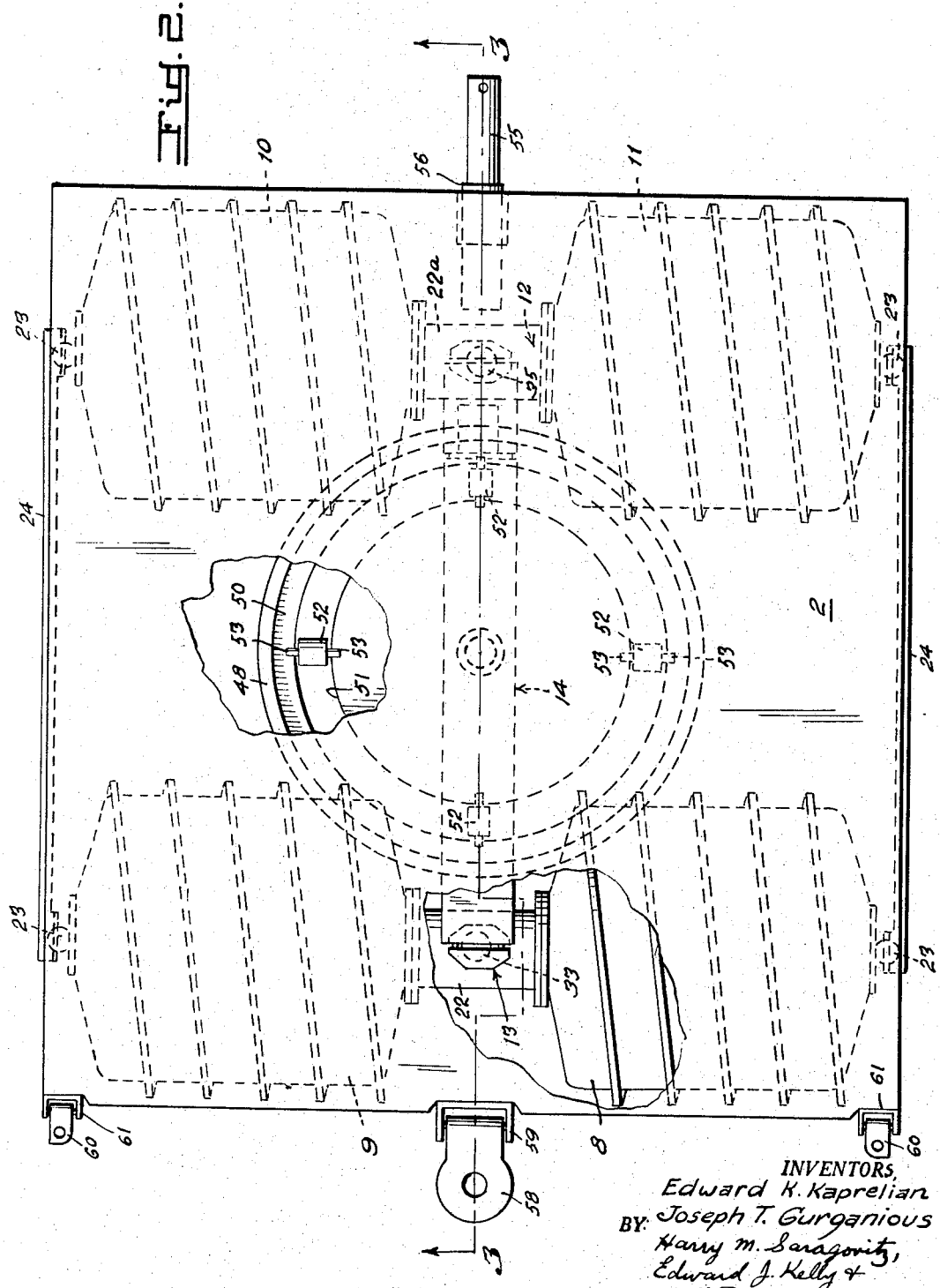

April 9, 1968
E. K. KAPRELIAN ET AL
3,376,945
DUAL-MODE VEHICLE
Filed Oct. 5, 1965
3 Sheets-Sheet 3
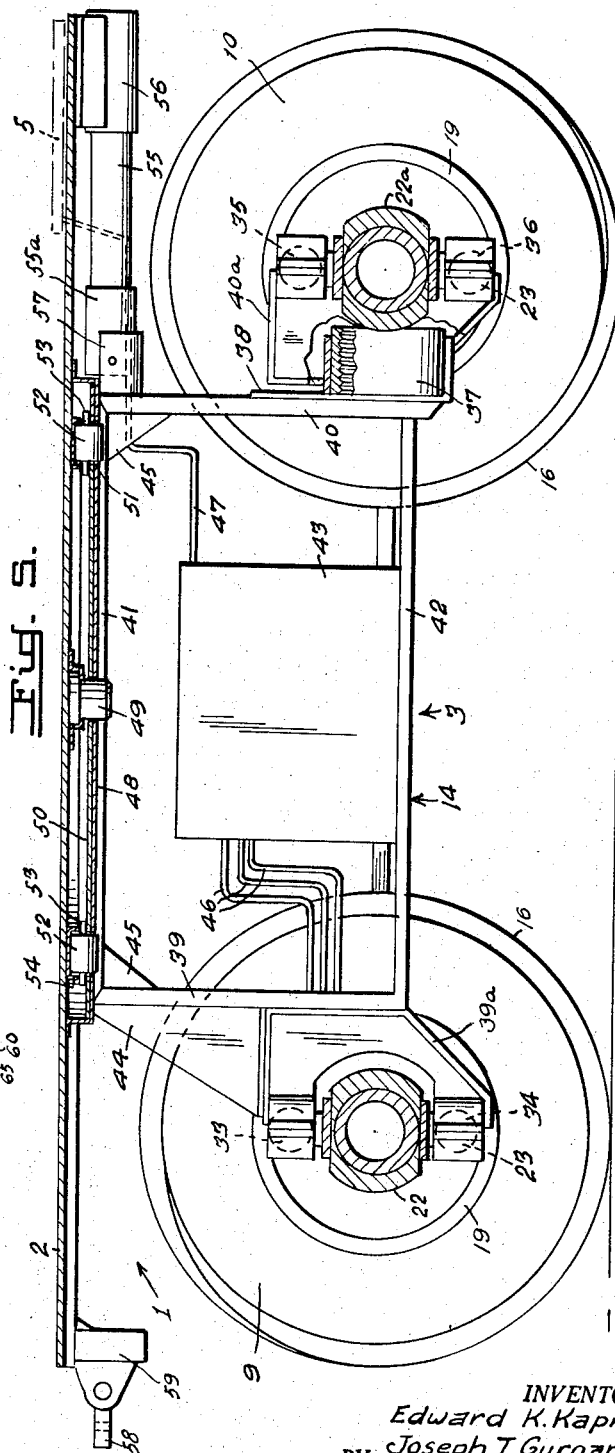
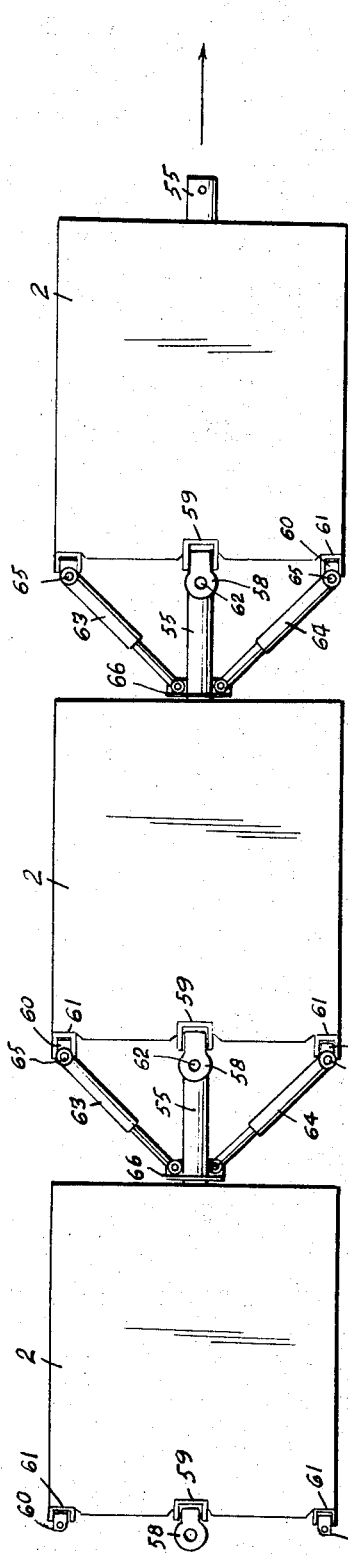
INVENTORS,
Edward K. Kaprelian
Joseph T. Gurganious
BY: Harry M. Saragovitz,
Edward J. Kelly &
A. J. DuPont Attorneys.

3,376,945
DUAL-MODE VEHICLE
Edward K. Kaprelian, 811 Philadelphia Road, Joppa, Md. 21085, and Joseph T. Gurganious, 313 Wakefield Place, Bel Air, Md. 21014
Filed Oct. 5, 1965, Ser. No. 493,285
6 Claims. (Cl. 180—6.48)

ABSTRACT OF THE DISCLOSURE

A dual-mode vehicle including a frame on which a flat bed is rotatably mounted, a pair of axle assemblies pivoted to the frame, wheel screws mounted on the axle assemblies, a motive power located in each wheel screw for independently driving each wheel screw and coupling members at each end of the bed for operating more than one vehicle in train, one of the coupling members preventing rotation of the bed when the vehicle is operated as a single unit.

---

The invention described herein may be manufactured and used by or for the Government for governmental purposes, without the payment to use of any royalty thereon.

This invention relates to a dual-mode vehicle and more particularly to a multipurpose vehicle that can operate successfully over any type of terrain or in water.

Present type amphibious vehicles do not permit all terrain mobility and are usually wheeled, tracked or are combined with a boat.

It is an object of this invention to provide a vehicle to operate purely as a wheel, a screw, a combination wheel and screw or vice versa.

Another object is to provide an amphibious vehicle capable of operating on all types of terrain and on water.

A further object is to provide a vehicle having four buoyant wheels, each capable of being independently driven at variable speeds in a clockwise or a counterclockwise manner and each wheel having helical grousers thereon.

A still further object is to provide an all terrain vehicle adaptable to be operated in multiple units as a train.

A final object is to provide an amphibious vehicle capable of moving both sideways and forwards.

These and other objects and advantages of the present invention will be fully apparent from the following description when taken in connection with the annexed drawing, in which:

FIG. 2 is a top plan view of the vehicle with the bed broken away to expose parts of the chassis;

FIG. 3 is a central sectional view taken along line 3—3 of FIG. 2;

FIG. 5 is a top plan view, somewhat schematic, of three of the vehicles connected together as a train.

Figure 1:
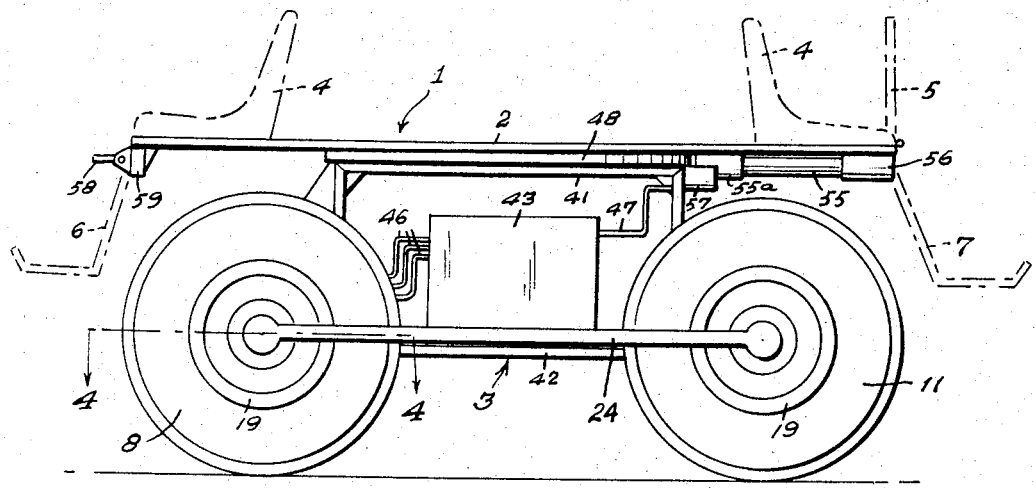
FIG. 1 is a side elevation of the dual-mode vehicle of the invention.

Referring in detail to the drawings in which like reference characters denote like parts throughout the description, reference character 1 designates generally the vehicle of the invention.

The vehicle 1 consists of a flat bed 2 and a chassis which is indicated generally by 3.

The bed 2 is for the purpose of whatever use is desired such as seats 4, an operating panel 5 and foot rests 6 and 7, all shown in dotted lines, all of which may be detachable or hinged to bed 2 as expedient. Cargo may also be carried by bed 2 by suitable means such as side panels, etc., not shown.

The chassis 3 is mounted on four screw wheels 8, 9, 10 and 11, composite front and rear axle assemblies indicated generally by 12 and 13 respectively and a framework, indicated generally by 14.

All wheel screws are identical and consist of a tire 15, which may be of rubber, plastic material or metal, and provided with helical grousers 16 as shown.

Figure 4:
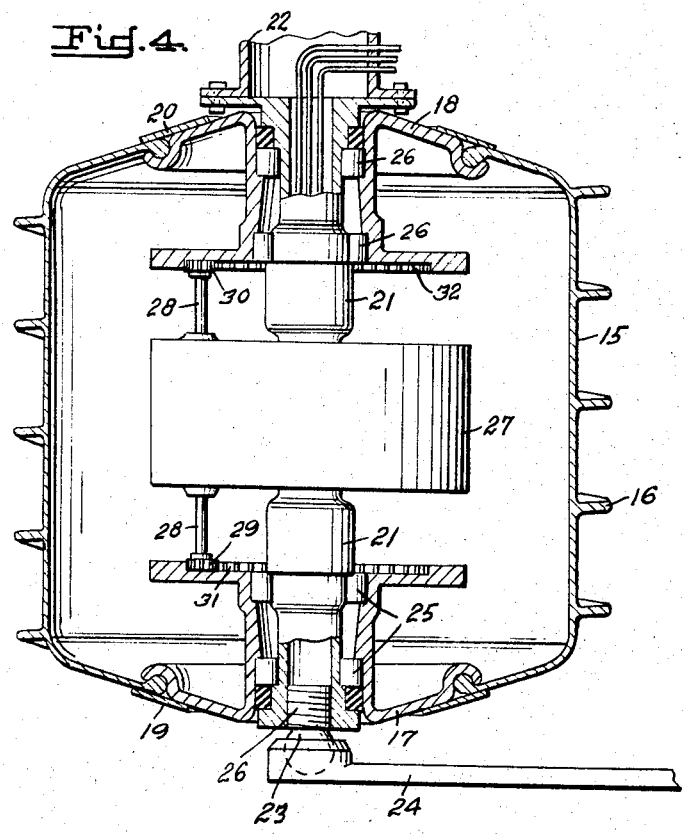
FIG. 4 is a partial axial section taken along line 4—4 of FIG. 1.

Tires 15 are mounted on wheel hubs 17 and 18 and held thereon by annular flanges 19 and 20 (see FIG. 4).

Wheel hubs 17 and 18 are rotatably mounted on a stub axle 21 which is, in turn, mounted on front and middle axles 22 and 22a.

All wheel screws 8, 9, 10 and 11 are similarly mounted.

Axle assemblies 12 and 13 are held in parallel relation by ball joints 23 and connecting bars 24.

Bearings 25 and 26 provide antifriction means between hubs 17 and 18, as shown.

Ball joints 23 are provided with a threaded portion 26 which is threaded into stub axles 21.

Each wheel screw is provided with its own motive power means, comprising a hydraulic motor 27 (FIG. 4) which is mounted on stub axles 21. Stub axles 21 and middle axles 22 and 22a are stationary.

Each hydraulic motor 27 drives a double ended shaft 28. Shaft 28 has pinion gears 29 and 30 carried by each of its ends and meshing with ring gears 31 and 32 mounted on wheel hubs 17 and 18 respectively.

Rear middle axle 22 is pivotally mounted on framework 14 by ball joints 33 and 35 while front middle axle 22a is mounted on framework 14 by ball joints 34 and 36. However, front middle axle 22a is somewhat differently mounted than is rear middle axle 22. In this case axle 22a and ball joints 35 and 36 are mounted on a threaded joint 37 fixed to a back plate 38 which, in turn, is fixed to framework 14 by suitable means such as welding, bolts, etc. (not shown). Joint 37 provides vertical oscillation for axle assembly 13 as well as turning.

Framework 14 consists of upright angle pieces 39 and 40 and top and bottom plates 41 and 42. Plate 42 provides a base for the mounting of an engine driven hydraulic pump 43 and other operating elements.

Brackets 39a and 40a provide means for mounting ball joints 33 and 35 respectively and are secured to uprights 39 and 40.

Angle pieces 44 and 45 reinforce the framework, as seen in FIG. 4. The framework 14 may be welded together. Angle piece 44 may be welded to bracket 39a and upright 39 for further reinforcement.

A system of hydraulic conduits 46 leads from pump 43 through stub axle 21 and middle rear axle 22 as shown, while other conduits 47 (one shown) may lead from pump 43 to operating panel 5 for the purpose of controlling the driving system. (Each motor 27 will be separately controlled from panel 5.)

Means are provided for the rotation of bed 2 with respect to chassis 3 if desired to operate more than one vehicle in train. These means consist of a circular housing 48 which is fixed centrally to the underside of bed 2 (see FIG. 4).

A king pin 49 is fixed to a middle point to the underside of bed 2.

A circular bearing plate 50 is supported in housing 48 and this plate is provided with an annular opening 51, best seen in FIG. 2.

Rollers 52 (four shown in FIG. 2) ride in annular opening 51, as shown in FIG. 2; and these rollers are provided with axles 53 which extend from either side thereof and ride on plate 50. An annular, inverted channel member 54 provides a guide for rollers 52 and is fixed to the underside of bed 2.

When the vehicle is operated as a single unit, the bed 2 is locked against rotation. This is provided by a sliding tube 55 (FIG. 3) which slides in a tubular guide member 56 and is received in a semitubular lock-out socket 57, as shown. Tube 55 is further provided with an enlarged head 55a which prevents complete withdrawal from tube 56.

When it is desired to operate more than one vehicle in train, means are provided for this connection and for steering. These means comprise (see FIG. 5) a link 58, pivoted in a bracket 59 which is carried centrally by bed 2 at the rearward end thereof. End links 60 are pivoted in brackets 61 fixed at the ends of bed 2 as shown.

Sliding tube 55 is withdrawn from lock-out socket 57 and connected to link 58 by a pin 62.

Hydraulic cylinders 63 and 64 are pivotally mounted on links 60 by pins 65 at one of their ends and at their other ends on a bracket 66 which may be slidably mounted on sliding tube 55. Sliding tube 55 acts as the tow bar. Conduits (not shown) may connect cylinders 63 and 64 to a hydraulic power source for their operation and may also be controlled from panel 5. Steering is accomplished by cylinders 63 and 64.

The framework 14 is disposed entirely between wheel screws 8, 9, 10 and 11 as shown in FIG. 2 and the middle axles 22 and 22a are pivoted to the brackets 39a and 40a by ball joints.

In operation, the vehicle is propelled by the hydraulic motors 27 which are motivated by the hydraulic engine pumping system 43. The operating means (not shown) will be mounted on panel 5 and may consist of levers to regulate the speed of the motors 27 as well as a steering wheel, etc., also not shown.

All wheel screws are capable of being driven clockwise or counterclockwise.

For operation over firm terrain the wheel screws will rotate in the same direction and will also be used to steer the vehicle; the operator will vary the speed of each wheel so that the vehicle will turn as desired. Axle assembly 12 is the steering axle. If, for instance, the speed of wheel screw 10 is set at a higher speed than wheel screw 11, the vehicle (according to FIG. 2) will turn right.

In soupy mud, the wheel screws may be made to rotate clockwise and counterclockwise in combination so that the vehicle will move both sidewise and forwards such as in the manner of a crab. In water the same operation is possible because of the buoyancy of the wheels.

When two or more vehicles are used in train, the hydraulic system of the forward vehicle will be connected to the hydraulic system of the trailing vehicle, or vehicles, in such manner that all vehicles will be controlled from the operating panel of the front vehicle. The hydraulic cylinders 63 and 64 will be activated to produce articulation between the units.

Vertical and rotational articulation, due to unleveled conditions of terrain is compensated by connecting bars 24, which automatically align the wheel screws.

It will be apparent from the foregoing, that a vehicle has been devised to operate over water, mud and difficult terrain as well as level terrain, and that the wheel screws in combination with the pivoted axles will adapt thereto at the will of the operator.

While only one preferred form of the invention has been shown and described, other forms of the invention are contemplated and numerous changes and modifications may be made therein without departing from the spirit of the invention as set forth in the appended claims.

What is claimed is:

1. A dual-mode vehicle comprising in combination, a rigid frame work; a bed; front and rear axle assemblies pivotally mounted, one each, at each end of said framework; hollow wheel screws mounted, one each, on each end of said axle assemblies; motive means disposed within each wheel screw and supported on said axle assemblies for independently driving said wheel screws; a power source for said motive means supported within said framework; and a means carried by said bed and said framework for rotatably mounting said bed on said framework, said last named means comprising a circular housing carried by the upper side of said framework, a circular bearing plate having an annular opening located in said housing, a plurality of rollers having axles extending from each side thereof, said axles riding on said bearing plate and said rollers riding in said annular opening, a circular, inverted channel member carried by the under side of said bed and receiving a portion of said rollers therein and a king pin centrally fixed to the under side of said bed and received in the upper side of said framework.

2. A dual-mode vehicle as set forth in claim 1 wherein each said wheel screw comprises a pair of spaced hub members rotatably mounted on a said axle assembly, and a cylindrical tire fixed at its ends to said hub members, said tire having a helical grouser integral with its outer peripheral surface thereof.

3. A dual-mode vehicle as set forth in claim 1 wherein said axle assemblies comprise a front stationary middle axle pivotally mounted to the front end of said framework for turning, a threaded joint connecting said front middle axle to said framework for vertical oscillation, and a front stub axle fixed to each end of said front middle axle for rotatable mounting of said wheel screws, a rear middle stationary axle pivotally mounted to the rear end of said framework, a rear stub axle fixed to each end of said rear middle axle for rotatable mounting of said wheel screws and a connecting bar pivotally mounted on each end of said front and rear stub axles for automatic alignment of said wheels.

4. A dual-mode vehicle as set forth in claim 1 wherein said framework comprises upright members, top and bottom plates carried by said upright members and a bracket member fixed to the front and rear ends of said framework for mounting said front and rear axle assemblies, said framework having a width whereby it is disposed between said wheel screws.

5. A dual-mode vehicle as set forth in claim 1 wherein said motive means comprise a hydraulic motor carried by each said stub axle and contained entirely within each said wheel screw for independent driving thereof, there being a pair of spaced ring gears carried by said wheel screw and disposed inside thereof, a driven shaft extending from each end of said hydraulic motor and a pinion gear fixed on each end of said shaft and being in mesh with a said ring gear.

6. A dual-mode vehicle comprising in combination, a rigid framework; a bed supported on said framework; front and rear axle assemblies pivotally mounted, one each, at each end of said framework; wheel screws mounted, one each, on each end of said axle assemblies; motive means mounted on said axle assemblies and disposed, one each, within each wheel screw for the independent driving thereof; a power source for said motive means supported within said framework; and means carried by the front and rear of said bed for coupling two or more said vehicles when said vehicles are operated in train; the front means being adapted to lock said bed against rotation with respect to said framework when said vehicle is operated as a single unit, said last named means comprising a semi-tubular lock-out socket fixed to an upper end of said framework, a tubular guide spaced from and in axial alignment with said lock-out socket and fixed to the underside of said bed and a tube having a rearward head slidable in said tubular guide, said head being received in said lock-out socket when said tube is retracted to lock said bed against rotation with respect to said framework and said head preventing complete withdrawal from said tubular guide when fully extended.

References Cited

UNITED STATES PATENTS

| | | |
|---|---|---|
| 1,374,761 | 4/1921 | Pomilio. |
| 1,672,613 | 6/1928 | Howell. |
| 2,011,045 | 8/1935 | Fitzgibbon _____ 115—19 |
| 2,130,418 | 9/1938 | Du Pont et al. _____ 280—408 |
| 2,432,107 | 12/1947 | Williams _____ 115—20 X |
| 3,205,962 | 9/1965 | Anderson. |
| 3,250,239 | 5/1966 | Garate _____ 115—19 X |

FOREIGN PATENTS 129,814  4/1932  Austria.

RICHARD J. JOHNSON, *Primary Examiner.*

BENJAMIN HERSH, *Examiner.*

J. A. PEKAR, *Assistant Examiner.*